United States Patent
Danielou et al.

(10) Patent No.: US 11,472,532 B2
(45) Date of Patent: Oct. 18, 2022

(54) EXTRADOS STRUCTURAL ELEMENT MADE FROM AN ALUMINIUM COPPER LITHIUM ALLOY

(71) Applicant: CONSTELLIUM ISSOIRE, Issoire (FR)

(72) Inventors: Armelle Danielou, Les Echelles (FR); Gaelle Pouget, Grenoble (FR); Christophe Sigli, Grenoble (FR)

(73) Assignee: Constellium Issoire, Issoire (FR)

( * ) Notice: Subject to any disclaimer, the term of this patent is extended or adjusted under 35 U.S.C. 154(b) by 1298 days.

(21) Appl. No.: 14/899,743

(22) PCT Filed: Jun. 18, 2014

(86) PCT No.: PCT/FR2014/000138
§ 371 (c)(1),
(2) Date: Dec. 18, 2015

(87) PCT Pub. No.: WO2015/011346
PCT Pub. Date: Jan. 29, 2015

(65) Prior Publication Data
US 2016/0144946 A1    May 26, 2016

(30) Foreign Application Priority Data
Jul. 21, 2013   (FR) ..................... 13/01459

(51) Int. Cl.
*B64C 3/26*      (2006.01)
*C22F 1/057*      (2006.01)
(Continued)

(52) U.S. Cl.
CPC .............. *B64C 3/26* (2013.01); *B22D 21/007* (2013.01); *C21D 1/30* (2013.01); *C21D 8/00* (2013.01);
(Continued)

(58) Field of Classification Search
CPC .......... B64C 3/26; B22D 21/007; C21D 1/30; C21D 8/00; C22C 1/026; C22C 21/12; C22C 21/14; C22C 21/16; C22F 1/057
See application file for complete search history.

(56) References Cited

U.S. PATENT DOCUMENTS

| | | | |
|---|---|---|---|
| 5,032,359 A | 7/1991 | Pickens et al. | |
| 5,389,165 A | 2/1995 | Cho | |

(Continued)

FOREIGN PATENT DOCUMENTS

| | | |
|---|---|---|
| CN | 102021457 A | 4/2011 |
| WO | 2009036953 A1 | 3/2009 |

(Continued)

OTHER PUBLICATIONS

Wu, X.z., et al. "Effect of Minor Silver Addition on Microstructure and Properties of Al-8Zn-1.Cu-1.3Mg-0.1Zr Alloys." Advanced Materials Research, vol. 834-836, 2013, pp. 360-363 (Year: 2013).*

(Continued)

*Primary Examiner* — Keith Walker
*Assistant Examiner* — Ryan L Heckman
(74) *Attorney, Agent, or Firm* — McBee Moore & Vanik IP, LLC

(57) ABSTRACT

Extrados structural element made from an aluminum, copper and lithium alloy and method for manufacturing same. An alloy with composition (in wt %) 4.2-5.2 Cu, 0.9-1.2 Li, 0.1-0.3 Ag, 0.1-0.25 Mg, 0.08-0.18 Zr, 0.01-0.15 Ti, an Fe and Si content level less than or equal to 0.1% each, and other element with content level less than or equal to 0.05% each and 0.15% in total, is poured, homogenized, deformed hot, placed in a solution at a temperature of at least 515° C., pulled from 0.5 to 5% and annealed. The combination of magnesium, copper and manganese content with the temperature in solution can reach an advantageous elasticity (Continued)

under compression limit. Products having a thickness of at least 12 mm have, in the longitudinal direction, an elasticity under compression limit of at least 645 MPa and an elongation of at least 7%.

15 Claims, 2 Drawing Sheets

(51) Int. Cl.
    *C22C 21/12*    (2006.01)
    *B22D 21/00*    (2006.01)
    *C21D 1/30*     (2006.01)
    *C21D 8/00*     (2006.01)
    *C22C 1/02*     (2006.01)
    *C22C 21/14*    (2006.01)
    *C22C 21/16*    (2006.01)

(52) U.S. Cl.
    CPC .............. *C22C 1/026* (2013.01); *C22C 21/12* (2013.01); *C22C 21/14* (2013.01); *C22C 21/16* (2013.01); *C22F 1/057* (2013.01)

(56) References Cited

U.S. PATENT DOCUMENTS

| | | | |
|---|---|---|---|
| 5,455,003 | A | 10/1995 | Pickens et al. |
| 7,229,509 | B2 | 6/2007 | Cho |
| 7,438,772 | B2 | 10/2008 | Rioja et al. |
| 9,945,010 | B2 * | 4/2018 | Danielou ................ C22C 21/16 |
| 2005/0006008 | A1 | 1/2005 | Cho |
| 2008/0173378 | A1 * | 7/2008 | Khosla .................. C22C 21/10 148/550 |
| 2009/0142222 | A1 * | 6/2009 | Colvin ................... C22C 21/16 420/532 |
| 2009/0180920 | A1 * | 7/2009 | Reichlinger ........... C22F 1/053 420/532 |
| 2010/0126637 | A1 * | 5/2010 | Heymes .................. C22F 1/04 148/502 |
| 2011/0247730 | A1 | 10/2011 | Yanar et al. |
| 2012/0152415 | A1 | 6/2012 | Danielou et al. |
| 2012/0225271 | A1 | 9/2012 | Boselli et al. |
| 2012/0258010 | A1 * | 10/2012 | Garat .................... C22C 21/14 420/535 |
| 2013/0269840 | A1 | 10/2013 | Danielou et al. |

FOREIGN PATENT DOCUMENTS

| | | | |
|---|---|---|---|
| WO | WO-2009036953 A1 * | 3/2009 | ............. C22C 21/12 |
| WO | 2012085359 A2 | 6/2012 | |
| WO | 2013172910 A2 | 11/2013 | |

OTHER PUBLICATIONS

International Search Report from corresponding PCT/FR2014/000138, dated Dec. 1, 2014.
Van Horn, Kent R. ed., "Alumimium vol. III. Fabrication and Finishing," American Society for Metals, 1967.
Barton, Matthew; Grounds for Opposition European Patent No. EP3011068B1 European Patent Application No. 14750519.2 Patent Holder: Constellium Issoire; Dated: Feb. 28, 2018.

* cited by examiner

EXTRADOS STRUCTURAL ELEMENT MADE FROM AN ALUMINIUM COPPER LITHIUM ALLOY

CROSS REFERENCE TO RELATED APPLICATIONS

This application is a § 371 National Stage Application of PCT/FR2014/000138, filed Jun. 18, 2014, which claims priority to FR 13/01459, filed 21 Jun. 2013.

BACKGROUND

Field of the Invention

The invention relates to aluminium-copper-lithium alloy products, and more particularly to such products, their manufacturing methods and use, designed in particular for aeronautical and aerospace engineering.

Description of Related Art

Products made of aluminium alloy are developed to produce parts of high strength designed for the aircraft and aerospace industry in particular.

Aluminium alloys containing lithium are of great interest in this respect because lithium can reduce the density of aluminium by 3% and increase the modulus of elasticity by 6% for each percent of lithium weight added. For these alloys to be selected for aircraft, their performance as compared to the other usual properties must attain that of alloys in regular use, in particular in terms of the compromise between static mechanical strength properties (tensile and compressive yield stress, ultimate tensile strength) and damage tolerance properties (fracture toughness, resistance to fatigue crack propagation), these properties being generally in opposition to each other. For certain parts such as the upper wing skins, the compressive yield stress is an essential property as it is decisive for the buckling characteristics. For certain parts, this characteristic is essential for the sizing and thus the weight of the parts.

These alloys must also have sufficient corrosion resistance, allowing them to be shaped according to the usual methods and to have low residual stresses in order to be able to be machined integrally.

U.S. Pat. No. 5,032,359 describes a vast family of aluminium-copper-lithium alloys in which the addition of magnesium and silver, in particular between 0.3 and 0.5 percent by weight, makes it possible to increase the mechanical strength.

U.S. Pat. No. 5,455,003 describes a method for manufacturing Al—Cu—Li alloys that have improved mechanical strength and fracture toughness at cryogenic temperature, in particular owing to appropriate work hardening and aging. This patent particularly recommends the composition, expressed as a percentage by weight, Cu=3.0-4.5, Li=0.7-1.1, Ag=0-0.6, Mg=0.3-0.6 and Zn=0-0.75.

U.S. Pat. No. 7,438,772 describes alloys including, expressed as a percentage by weight, Cu: 3-5, Mg: 0.5-2, Li: 0.01-0.9 and discourages the use of higher lithium content because of a reduction in the balance between fracture toughness and mechanical strength.

U.S. Pat. No. 7,229,509 describes an alloy including (% by weight): (2.5-5.5) Cu, (0.1-2.5) Li, (0.2-1.0) Mg, (0.2-0.8) Ag, (0.2-0.8) Mn, 0.4 max Zr or other grain-refining agents such as Cr, Ti, Hf, Sc, and V.

US patent application 2009/142222 A1 describes alloys including (as a percentage by weight), 3.4% to 4.2% Cu, 0.9% to 1.4% Li, 0.3% to 0.7% Ag, 0.1% to 0.6% Mg, 0.2% to 0.8% Zn, 0.1% to 0.6% Mn and 0.01% to 0.6% of at least one element for controlling the granular structure. This application also describes a method for manufacturing extruded products.

Patent application WO2009/036953 concerns a product made of aluminium alloy for structural elements having a chemical composition comprising, in % by weight: Cu 3.4 to 5.0, Li 0.9 to 1.7, Mg 0.2 to 0.8, Ag approx. 0.1 to 0.8, Mn 0.1 to 0.9, Zn up to 1.5, and one or more elements selected from the group consisting of: (Zr approx. 0.05 to 0.3, Cr 0.05 to 0.3, Ti approx. 0.03 to 0.3, Sc approx. 0.05 to 0.4, Hf approx. 0.05 to 0.4), Fe<0.15, Si<0.5, the normal and inevitable impurities.

Patent application WO 2012/085359 A2 relates to a method for manufacturing rolled products made of an alloy containing aluminium comprising 4.2 to 4.6% Cu by weight, 0.8 to 1.30% Li by weight, 0.3 to 0.8% Mg by weight, 0.05 to 0.18% Zr by weight, 0.05 to 0.4% Ag by weight, 0.0 to 0.5% Mn by weight, at the most 0.20% Fe+Si by weight, less than 0.20% Zn by weight, at least one element chosen from Cr, Se, Hf and Ti, the quantity of said element, if it is chosen, being from 0.05 to 0.3% by weight for Cr and Se, 0.05 to 0.5% by weight for Hf and from 0.01 to 0.15% by weight for Ti, other elements at most 0.05% by weight each and 0.15% by weight in total, the rest aluminium, including the stages of production, casting, homogenization, rolling at temperature greater than 400° C., solution heat treatment, quenching, stretching between 2 and 3.5% and artificial aging.

Patent application US2012/0225271 A1 concerns wrought products of at least 12.7 mm thick containing 3.00 to 3.80% Cu by weight, 0.05 to 0.35% Mg by weight, 0.975 to 1.385% Li by weight, in which $-0.3*Mg-0.15Cu+1.65 \leq Li \leq -0.3*Mg-0.15Cu+1.85$, 0.05 to 0.50% by weight of at least one control element of the grain structure, in which the element for controlling the structure of the grains is selected from the group consisting of Zr, Sc, Cr, V, Hf, other rare earth elements, and combinations of those, up to 1.0% Zn by weight, up to 1.0% Mn by weight, up to 0.12% Si by weight, up to 0.15% Fe by weight, up to 0.15% Ti by weight, up to 0.10% by weight of other elements with a total not exceeding 0.35% by weight. The article "The effect of composition on the Weldability of Al—Cu—Li—Ag—Mg Alloys in the High Cu:Li Regime" by L. S Kramer, C. E. Cross & J. R. Pickens, Sixth International Aluminium-Lithium Conference; Garmisch-Partenkirchen; Germany; 7-11 Oct. 1991, describes alloys containing (wt. %) 5 to 6.3% Cu, 1 to 1.9% Li, 0 to 0.4% Mg, 0 to 0.4% Ag and 0 to 0.1% Ti.

There exists a need for worked products made of aluminium-copper-lithium alloy having improved properties as compared to those of known products, in particular in terms of the compromise between static mechanical resistance properties and in particular having very high compressive yield stress and damage tolerance properties, in particular fracture toughness, thermal stability, and sufficient corrosion resistance and machinability, while being of low density.

In addition there exists a need for a reliable and economic manufacturing method for these products.

SUMMARY

A first object of the invention is a method for manufacturing an extruded, rolled and/or forged product made of an alloy based on aluminium in which:

a) a molten metal bath is prepared comprising
   4.2 to 5.2% Cu by weight,
   0.9 to 1.2% Li by weight,
   0.1 to 0.3% Ag by weight,
   0.1 to 0.25% Mg by weight,
   0.08 to 0.18% Zr by weight,
   0.01 to 0.15% Ti by weight,
   optionally up to 0.2% Zn by weight,
   optionally up to 0.6% Mn by weight,
   a Fe and Si content less than or equal to 0.1% by weight each, other elements with a content less than or equal to 0.05% by weight each and 0.15% by weight total, and the rest aluminium,
b) a rough shape is cast from said molten metal bath;
c) said shape is homogenized by a heat treatment in which the temperature at mid-thickness of the rough shape reaches at least 510° C. for at least 10 hours,
d) said rough shape is hot worked and optionally cold worked, then homogenized into an extruded, roll and/or forged product;
e) said product is solution heat treated at a temperature of at least 515° C. and quenched;
f) said product undergoes controlled stretching with a permanent set of 0.5 to 5%;
g) said product is aged by heating to a temperature of 140 to 170° C. for 5 to 70 hours.

Another object of the invention is an extruded, rolled and/or forged product made of aluminium alloy obtainable by the method according to the invention, having a thickness of at least 12 mm, a compressive yield stress in the longitudinal direction of at least 645 MPa and an elongation in the longitudinal direction of at least 7%.

Yet another object of the invention is a upper wing skin structural element incorporating at least one product according to the invention or manufactured from such a product.

DETAILED DESCRIPTION OF A PREFERRED EMBODIMENT

Unless otherwise specified, all the indications concerning the chemical composition of the alloys are expressed as a percentage by weight based on the total weight of the alloy. The expression 1.4 Cu means that the copper content, expressed as a percentage by weight is multiplied by 1.4. The designation of alloys is compliant with the rules of The Aluminium Association, known to those skilled in the art. The density depends on the composition and is determined by calculation rather than by a method of weight measurement. The values are calculated in compliance with the rules of The Aluminium Association, which is described on pages 2-12 and 2-13 of "Aluminium Standards and Data". The definitions of the metallurgical tempers are indicated in European standard EN 515. The static mechanical properties under stretching, in other terms the ultimate tensile strength $R_m$, the conventional yield stress at 0.2% elongation $R_{p0.2}$, and elongation at rupture A %, are determined by a tensile test as per NF EN ISO 6892-1, the sampling and direction of the test being defined by the standard EN 485-1. The compressive yield stress was measured at 0.2% of compression as per standard ASTM E9.

The stress intensity factor ($K_Q$) is determined according to standard ASTM E 399. Standard ASTM E 399 gives the criteria which make it possible to determine if $K_Q$ is a valid value of $K_{1C}$. For a given test specimen geometry, the values of $K_Q$ obtained for various materials are comparable with each other insofar as the yield stresses of the material are of the same order of magnitude.

Figure 2:
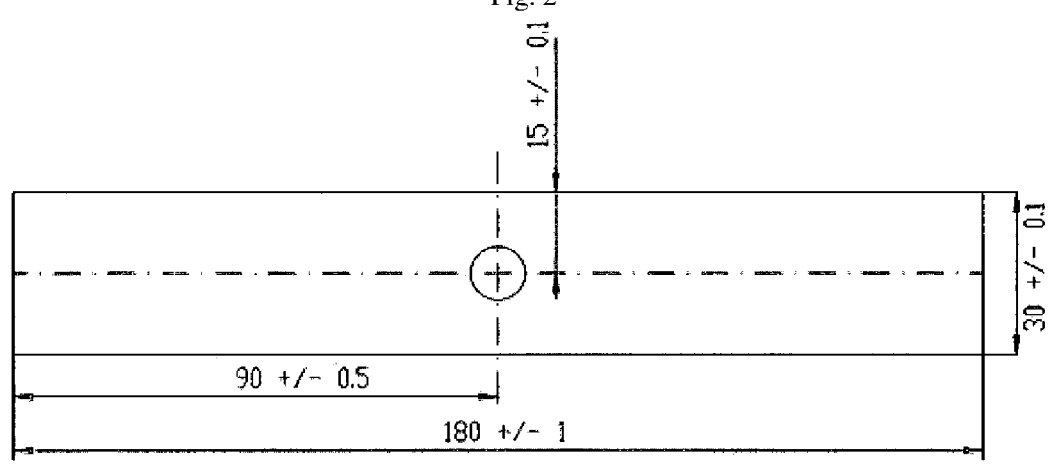
FIG. 2: Diagram of test specimen used for open-hole fatigue testing. Dimensions are given in mm.

The fatigue properties of open-hole test specimen are measured in ambient air for varying levels of stress, at a frequency of 50 Hz, and a stress ratio of R=0.1, on test specimen as shown in FIG. 2, $K_t$=2.3, taken at the centre and mid-thickness of the plates in the L-T direction. The Walker equation was used to determine a maximum stress value representative of 50% of non-ruptures at 100,000 cycles. To do this, a fatigue quality index (IQF) is calculated for each point of the Wöhler curve with the formula $$IQF = \sigma_{max}\left(\frac{N_0}{N}\right)^{1/n}$$

where $\sigma_{max}$ is the maximum stress applied to a given sample, N is the number of cycles to rupture, $N_0$ is 100,000 and n=−4.5. The IQF corresponding to the median, or 50% rupture for 100,000 cycles, is reported.

Within the framework of the invention, the static mechanical properties under traction, the compressive yield stress and the stress intensity factor are measured at mid-thickness of the products.

Unless otherwise specified, the definitions of standard EN 12258 apply.

According to this invention, it is possible to improve the compressive yield stress of aluminium copper lithium magnesium alloy, wherein the copper content is between 4.2 and 5.2% by weight and the lithium content between 0.9 and 1.2% by weight by reducing the magnesium content, in relation to the known contents by at least 0.3% by weight and by simultaneously increasing the temperature of the solution heat treatment. Surprisingly, the decrease in the magnesium content, the expected consequence of which is a decrease in the static mechanical properties, allows for an increase of the static mechanical properties for the alloys of the invention.

The alloy according to the invention contains 4.2 to 5.2% Cu by weight. A minimum copper content of 4.3% and preferably 4.4% by weight is beneficial in obtaining high static mechanical properties. A maximum copper content of 5.0% and preferably 4.8% by weight is beneficial in obtaining sufficient elongation and fracture toughness.

The alloy according to the invention contains 0.9 to 1.2% Li by weight. A minimum lithium content of 1.0% and preferably 1.03% by weight is beneficial in obtaining high static mechanical properties. A maximum lithium content of 1.15% and preferably 1.10% by weight is beneficial in obtaining sufficient elongation and fracture toughness. The alloy according to the invention contains 0.1 to 0.25% Mg by weight. A minimum magnesium content of 0.15% and preferably 0.20% by weight is beneficial in obtaining high static mechanical properties. A maximum magnesium content of 0.24% by weight is beneficial in further increasing the solution heat-treatment temperature. According to the present inventors, it is possible that the magnesium content according to the invention results in an increase in the solidus temperature and thus allows the solution heat-treatment temperature to be increased and thus to improve the solution heat treatment of the copper and the fraction of hardening phases after aging. The very high tensile and compressive yield stresses, sometimes in excess of 700 MPa in the case of extruded products, obtained with the alloys according to the invention while maintaining formability, the remaining elongation of at least 7%, are probably notably associated with the excellent solution heat treatment of the copper.

The alloy according to the invention contains 0.1 to 0.3% Ag by weight. A minimum silver content of 0.15% by weight and preferably of 0.20% by weight is advantageous. A maximum silver content of 0.25% by weight is advantageous. The present inventors believe that, contrary to what is expected, the relatively low silver content further increases the static mechanical strength while allowing the solution heat-treatment temperature to be increased.

The alloy according to the invention contains 0.08 to 0.18% Zr by weight. Preferably, the alloy according to the invention contains 0.11 to 0.18% Zr by weight. A minimum zirconium content of 0.13% by weight is advantageous. A maximum zirconium content of 0.17% by weight is advantageous. The alloy according to the invention contains 0.01 to 0.15% Ti by weight. A minimum titanium content of 0.02% by weight is advantageous. A maximum titanium content of 0.1% by weight and preferably of 0.05% of weight is advantageous. The addition of zirconium and titanium contributes to obtaining an essentially unrecrystallized structure which is advantageous. Furthermore, the addition of titanium helps to control the granular structure during casting.

Optionally, the alloy according to the invention contains up to 0.2% zinc by weight. In one embodiment of the invention the zinc content is less than 0.05% by weight.

Optionally, the alloy according to the invention contains up to 0.6% manganese by weight. In another advantageous embodiment, the manganese content is between 0.2% and 0.5% by weight and preferably between 0.3 or even 0.35 and 0.45% by weight. For the manufacture of plates, the addition of manganese simultaneously improves the compressive yield stress and fracture toughness, notably in the L-T direction, which is advantageous. For the manufacture of sections by extrusion, the addition of manganese also notably improves fracture toughness in the T-L direction. In another embodiment, it may be advantageous that the manganese content be less than 0.05% by weight for the manufacture of certain sections by extrusion.

The Fe and Si content of the alloy according to the invention is less than or equal to 0.1% by weight each, advantageously the iron content is less than 0.06% by weight and the silicium content is less than 0.04% by weight. The other elements have a content less than or equal to 0.05% by weight each and 0.15% by weight in total, the remainder is aluminium.

In the manufacturing method according to the invention, a molten metal bath is prepared of composition according to the invention, then rough form is cast such as a rolling slab, an extrusion billet or a forged blank, from said bath of molten metal.

The method according to the invention may comprise steps known to those skilled in the art such as scalping or stress-relief heat treatment of the cast slabs. The rough shape is homogenized by a heat treatment in which the temperature at mid-thickness of the rough shape reaches at least 510° C. for at least 10 hours. The alloy according to the invention, notably owing to the low magnesium and silver content, allows homogenization to be carried out at a high temperature without resulting in partial local melting, also known as incipient melting. Advantageously, the temperature at mid-thickness of the rough shape reaches at least 515° C. for at least 10 hours. Preferably, the homogenization is performed with at least two steps, typically at least a first step at a temperature between 495° C. and 505° C. for at least 10 hours and at least a second step at a temperature of at least 515° C. for at least 10 hours or by using a slow rate of temperature rise, typically less than 10° C./hour and preferably less than 6° C./hour starting at 490° C.

After homogenization, said rough shape is hot worked and optionally cold worked into an extruded, rolled and/or forged product. The hot working temperature is typically at least 350° C. and preferably at least 400° C.

Said product is then solution heat treated at a temperature of at least 515° C., preferably at least 520° C. and in certain cases at least 522° C. The duration of the solution heat treatment is adapted to the thickness of the product so that the solution heat-treatment temperature is reached at mid-thickness of the product, preferably for at least one hour. It is technically possible to perform solution heat-treatment at such a high temperature with alloys having a composition similar to that of alloys according to the invention as regards Cu, Li, Zr, Ti, Zn and Mn but higher in Mg and Ag but this leads to a reduction of the mechanical properties owing to inevitable incipient melting, notably the elongation and fracture toughness are decreased. The maximum temperature for solution heat treatment may be evaluated by differential scanning calorimetry (DSC) for the product produced at the hot working stage. The advantage of the alloys according to the invention is to reach a maximum temperature that can be used for solution heat-treatment without the risk of incipient melting, the rate of temperature rise being adapted to the geometry of the product by the person skilled in the art according to his general knowledge. Preferably, the solution heat-treatment is less than 530° C., when the treatment is performed with a single step. However, the present inventors have observed that with the alloys according to the invention it is possible to perform solution heat treatment with a first step between 515° C. and 520° C. and a second step of at least 530° C. and preferably at least 535° C. and to notably obtain a compromise between the elongation and the yield stress.

After solution heat treatment, the product is quenched, typically by immersion or spraying with water at ambient temperature. The solution heat-treated and quenched product is then stress relieved by controlled stretching with a permanent set of 0.5 to 5%. In an embodiment promoting the improvement of the compromise between the compressive yield stress and the fracture toughness, stress relieving by controlled stretching is performed with a permanent set less than 2% and advantageously from 0.5 to 1.5%. This embodiment with moderate permanent set may have the drawback of requiring a long aging period and have a negative effect on the productivity of the method. In another embodiment promoting the productivity of the method, stress relieving by controlled stretching is performed with a permanent set between 2% and 4%. The stretched product is then aged by heating at a temperature of 140 to 170° C. for 5 to 70 hours. Aging may be performed in one or more steps. In an embodiment in which the stress relieving by controlled stretching is performed with a permanent set less than 2%, aging is performed between 150 and 160° C. for 40 to 60 hours. In another embodiment in which the stress relieving by controlled stretching is performed with a permanent set greater than 2%, aging is performed between 150 and 160° C. for 10 to 40 hours.

The products thus obtained preferably have a primarily unrecrystallized granular structure. Within the scope of the present invention, a primarily unrecrystallized granular structure is taken to mean a granular structure such that the recrystallisation rate between ¼ and ½ thickness is less than 30% and preferably less than 20%. The products according to the invention preferably have a thickness of at least 12 mm. The thickness of the extruded products is defined according to standard EN 2066:2001: the cross section is divided into basic rectangles of dimensions A and B; A always being the largest dimension of the basic rectangle and B being regarded as the thickness of the basic rectangle. The base is a basic rectangle having the largest dimension A. Preferably, the thickness of the products according to the invention is at least 15 mm and less than 50 mm.

The method according to the invention, notably combining the composition according to the invention and homogenization and solution heat treatments according to the invention, allow a extruded, rolled and/or forged aluminium alloy product to be obtained having a thickness of at least 12 mm, a compressive yield stress in the longitudinal direction of at least 645 MPa and preferably at least 650 MPa and an elongation in the longitudinal direction of at least 7% and preferably at least 8%. The extruded products according to the invention advantageously have a compressive yield stress in the L direction of at least 680 MPa, a tensile yield stress in the L direction is at least 680 MPa and a fracture toughness $K_Q$(T-L), of at least 17 MPa√m. The extruded products according to the invention, whose manganese content is between 0.2 and 0.5% by weight, advantageously have a compressive yield stress in the L direction of at least 720 MPa, a tensile yield stress in the L direction of at least 710 MPa and a fracture toughness $K_Q$(T-L), of at least 18 MPa√m.

The rolled products according to the invention, having a thickness of at least 20 mm, advantageously have a compressive yield stress in the L direction of at least 650 MPa and a fracture toughness $K_Q$(L-T), of at least 18 MPa√m. In an advantageous embodiment in which the manganese content is between 0.2 and 0.5% by weight, the rolled products according to the invention, for which the thickness is at least 20 mm, advantageously have a compressive yield stress in the L direction of at least 653 MPa and preferably at least 655 MPa and a fracture toughness $K_Q$(L-T), of at least 20 MPa√m. Advantageously, rolled products according to the invention of at least 20 mm thickness also have advantageous fatigue properties for open-hole test specimen, and the fatigue quality index IQF obtained on open-hole test specimen Kt=2.3 according to FIG. 2 at a frequency of 50 Hz in ambient air with a value R=0.1 is at least 200 MPa and preferably at least 210 MPa in the T-L direction.

The upper wing skin structural elements incorporating at least one product according to the invention, or manufactured from such a product, are advantageous. "Structural element" of a mechanical construction here refers to a mechanical part for which the static and/or dynamic mechanical properties are particularly important for the performance of the structure, and for which a structural analysis is usually prescribed or performed. These are typically elements for which their failure is likely to endanger the safety of said construction, its users or others. The upper wing skin structural elements include the upper wing skin and the upper wing stringers or stiffeners.

EXAMPLES

Example 1

In this example, five plates of dimension 406×1520 mm, the composition of which is given in table 1, were cast. The alloys 1, 2 and 3 have a composition according to the invention. The alloys 4 and 5 have a reference composition.

TABLE 1

| Composition (% by weight) | | | | | | | | | |
|---|---|---|---|---|---|---|---|---|---|
| Alloy | Si | Fe | Cu | Mn | Mg | Ti | Zr | Li | Ag |
| 1 | 0.02 | 0.04 | 4.40 | 0.02 | 0.21 | 0.02 | 0.14 | 1.05 | 0.21 |
| 2 | 0.03 | 0.04 | 4.61 | 0.35 | 0.23 | 0.02 | 0.14 | 1.05 | 0.22 |
| 3 | 0.03 | 0.04 | 4.34 | 0.08 | 0.17 | 0.02 | 0.15 | 1.12 | 0.22 |
| 4 | 0.04 | 0.05 | 4.56 | 0.37 | 0.44 | 0.03 | 0.11 | 1.02 | 0.22 |
| 5 | 0.03 | 0.05 | 4.49 | 0.34 | 0.71 | 0.04 | 0.11 | 1.03 | 0.21 |

The slabs were homogenized. Following preliminary differential calorimetry tests, various conditions were used for different slabs in order to reach maximum homogenization without incipient melting. Slabs made with alloy 1, 2 and 3 were homogenized 15 h at 500° C. then 16 h at 516° C. Slabs 4 and 5 were homogenized 15 h at 492° C.

The slabs were hot rolled at a temperature above 420° C. in order to obtain plates 25 mm thick. After hot rolling, differential calorimetry tests were again performed to determine the solution heat-treatment temperature.

It was shown that the plates according to the invention could withstand a solution heat-treatment temperature of at least 515° C. while there is an incipient melting risk for the reference plates at this temperature and a solution heat-treatment temperature below 515° C. was required. The plates were solution heat treated at 516° C. (alloys 1 to 3), 512° C. (alloy 4) and 509° C. (alloy 5) for approximately 5 h, then quenched with water at 20° C. The plates made with alloy 1 and 2 were then fractionated approximately 3%. The plates made with alloys 4 and 5 were fractionated 4%.

Figure 1:
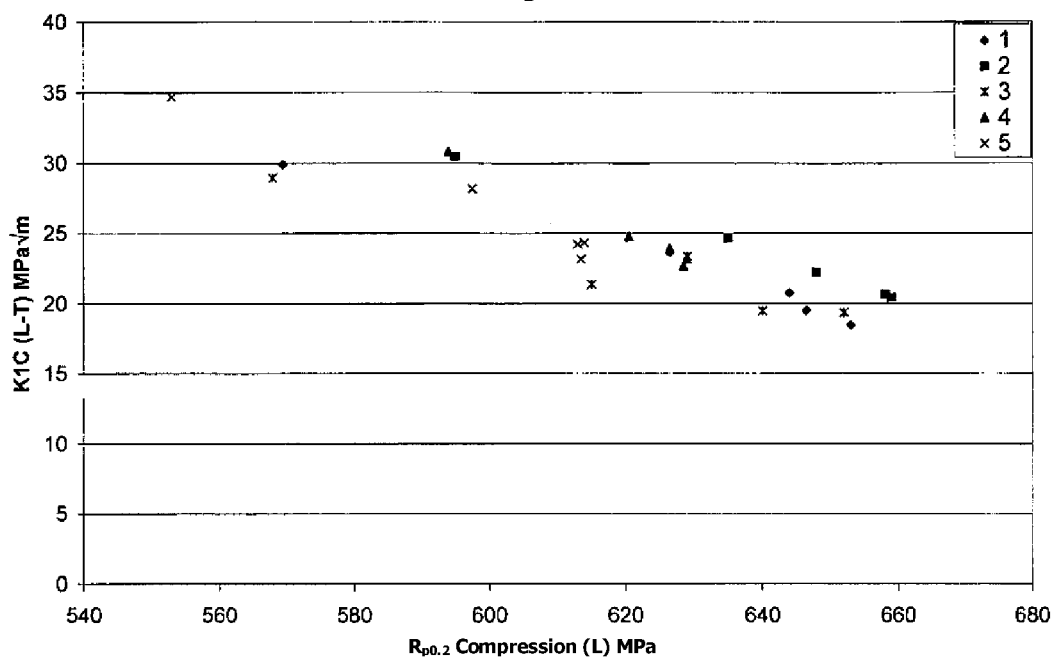
FIG. 1: Compromise in properties between the compressive yield stress and fracture toughness for the plates of example 1.

The static mechanical properties measured at mid-thickness, obtained after various aging conditions at 155° C., are given in Table 2 and represented in FIG. 1. The test specimen used for the fracture toughness measurement had width W=40 mm and thickness B=20 mm

TABLE 2

| Mechanical properties measured at mid-thickness | | | | | |
|---|---|---|---|---|---|
| | | Tensile properties in L direction | | Compression properties in | Fracture toughness $K_Q$ L-T (*: $K_{IC}$) |
| | Duration of aging at 155° C. | Rm MPa | $R_{p0.2}$ MPa | A (%) | L direction $Rc_{0.2}$ MPa | (MPa√m) |
| 1 | 0 | 432 | 308 | 14.0 | 271 | 36.1 |
|  | 10 | 621 | 567 | 11.3 | 570 | 29.9* |
|  | 15 | 650 | 611 | 8.4 | 627 | 23.6* |
|  | 20 | 660 | 625 | 7.6 | 644 | 20.8* |
|  | 30 | 663 | 632 | 7.5 | 647 | 19.5* |
|  | 50 | 670 | 640 | 6.9 | 653 | 18.5* |
| 2 | 0 | 454 | 321 | 12.2 | 285 | 37.8 |
|  | 10 | 629 | 581 | 8.9 | 595 | 30.5* |
|  | 15 | 652 | 612 | 8.2 | 635 | 24.7* |
|  | 20 | 657 | 621 | 7.3 | 648 | 22.2* |

TABLE 2-continued

Mechanical properties measured at mid-thickness

|   | Duration of aging at 155° C. | Tensile properties in L direction Rm MPa | $R_{p0.2}$ MPa | A (%) | Compression properties in L direction $Rc_{0.2}$ MPa | Fracture toughness $K_Q$ L-T (*: $K_{IC}$) (MPa√m) |
|---|---|---|---|---|---|---|
|   | 30 | 667 | 635 | 7.2 | 659 | 20.4* |
|   | 50 | 668 | 637 | 6.4 | 658 | 20.7* |
| 3 | 0  | 409 | 292 | 14.9 | 263 | 33.8 |
|   | 10 | 614 | 559 | 10.9 | 568 | 29.0* |
|   | 15 | 640 | 599 | 8.1 | 629 | 23.4* |
|   | 20 | 654 | 618 | 8.3 | 615 | 21.4* |
|   | 30 | 662 | 630 | 8.3 | 640 | 19.5* |
|   | 50 | 665 | 634 | 7.2 | 652 | 19.4* |
| 4 | 0  | 475 | 364 | 14.7 | 325 | 33.4 |
|   | 10 | 617 | 587 | 9.8 | 594 | 30.8* |
|   | 20 | 638 | 614 | 8.8 | 621 | 24.8* |
|   | 30 | 642 | 621 | 7.7 | 627 | 23.9* |
|   | 45 | 643 | 624 | 7.4 | 629 | 23.1* |
|   | 60 | 643 | 624 | 7.8 | 629 | 22.7* |
| 5 | 0  | 484 | 385 | 12.2 | 353 | 35.5 |
|   | 10 | 590 | 562 | 10.4 | 553 | 34.7 |
|   | 20 | 620 | 603 | 8.8 | 598 | 28.2* |
|   | 30 | 628 | 613 | 8.7 | 613 | 24.2* |
|   | 45 | 631 | 616 | 8.1 | 614 | 24.3* |
|   | 60 | 631 | 616 | 7.9 | 614 | 23.2* |

Example 2

In this example, the solution heat-treatment conditions were varied for a plate made with alloy 2, sampled after hot rolling. A solution heat treatment followed by quenching with water was performed in the time and temperature conditions indicated in Table 3. After quenching, the plates obtained were stress relieved by stretching with a permanent elongation of 3% and aging for 25 at 155° C.

The mechanical properties obtained through stretching in the L direction at mid-thickness are provided in Table 3.

TABLE 3

The mechanical properties under stretching in the L direction at mid-thickness for various solution heat-treatment conditions

| Conditions of solution heat treatment | Rp 0.2 (MPa) | Rm (MPa) | A % |
|---|---|---|---|
| 5 h 500° C. | 601 | 629 | 9.1 |
| 5 h 510° C. | 618 | 646 | 9.5 |
| 5 h 516° C. | 624 | 652 | 8.0 |
| 3 h 520° C. | 625 | 649 | 8.3 |
| 1 h 524° C. | 628 | 653 | 7.8 |
| 1 h 528° C. | 634 | 659 | 7.3 |
| 1 h 532° C. | 628 | 653 | 5.9 |
| 5 h 516° C. + 3 h 530° C. | 626 | 651 | 8.7 |
| 5 h 516° C. + 3 h 540° C. | 631 | 656 | 8.2 |

With the plates according to the invention, it is possible to significantly increase the solution heat-treatment temperature and to benefit from increased hardening potential.

Example 3

In this example, billets of 139 mm in diameter were sampled in slabs made of alloy 1 and 2. The billets were homogenized at 515° C., extruded in the form of bars of dimensions 54.6×16 mm at 460° C., then solution heat treated 4 hours at 520° C. and quenched in water. The bars thus obtained were stretched with a permanent elongation of 3%, then were aged 15 h or 25 h at 155° C.

The mechanical properties measured in the L direction at mid-thickness are provided in Table 4. The test specimen used for the fracture toughness measurement had width W=25 mm and thickness B=12.5 mm

TABLE 4

Mechanical properties obtained on sections made of alloy 1 and 2

| Alloy | Aging conditions | Properties under traction (L) $R_{p0.2}$ MPa | $R_m$ MPa | A (%) | Properties under compression (L) $Rc_{0.2}$ MPa | Fracture toughness $K_{IC}$ T-L (MPa√m) |
|---|---|---|---|---|---|---|
| 1 | 15 h 155° C. | 662 | 691 | 10.8 | 682 | 21.3 |
|   | 25 h 155° C. | 687 | 709 | 9.8 | 714 | 18.0 |
| 2 | 15 h 155° C. | 677 | 702 | 9.5 | 697 | 20.8 |
|   | 25 h 155° C. | 700 | 720 | 8.7 | 728 | 18.7 |

Example 4

In this example, the controlled stretching conditions were varied for a plate made of alloy 2 of thickness 25 mm, solution heat treated for 5 h at 516° C., the quenched with water at 20° C. The plates underwent controlled stretching with a permanent elongation of 1%, 2.1%, 3.5% or 4.5%. Different aging durations at 155° C. were performed in order to find an optimal compromise between the compressive yield stress and fracture toughness for each permanent elongation rate.

The results obtained are given in Table 5. The test specimen used for the fracture toughness measurement had width W=40 mm and thickness B=20 mm.

TABLE 5

The mechanical properties in the L direction at mid-thickness for various controlled stretching and quenching conditions

| Permanent elongation during controlled stretching | Duration of aging at (155° C.) | Tensile yield stress $R_{p0.2}$ (MPa) | Compressive yield stress $Rc_{0.2}$ (MPa) | $K_{IC}$ L-T (MPa√m) |
|---|---|---|---|---|
| 1   | 45 |     | 653* | 25.3 |
| 2.1 | 35 | 640 | 653  | 23.9 |
| 3.5 | 25 | 644 | 652  | 23.4 |
| 4.5 | 25 | 644 | 649  | 23.1 |

*value obtained by linear interpolation between a measurement of 645 MPa for aging of 35 h at 155° C. and 657 MPa for aging of 50 h at 155° C.

With permanent elongation during controlled stretching of 1%, a particularly advantageous compromise is obtained between the compressive yield stress and fracture toughness, for an aging duration of 45 h at 155° C. which is not favourable for the productivity of the method.

Example 5

In this example, the fatigue properties were evaluated on open-hole test specimen for alloys 2, 4 and 5 of example 1. Plates of thickness 25 mm were rolled, solution heat treated and stretched as described in example 1. The plate made of alloy 2 were aged 25 hours at 155° C., the plates of alloy 4 and 5 were aged 22 hours at 155° C.

The fatigue properties of open-hole test specimen were measured in ambient air for varying levels of stress, at a frequency of 50 Hz, and a stress ratio of R=0.1, on test specimen as shown in FIG. 2, $K_t$=2.3, taken at the centre and mid-thickness of the plates in the L-T direction.

Figure 3:
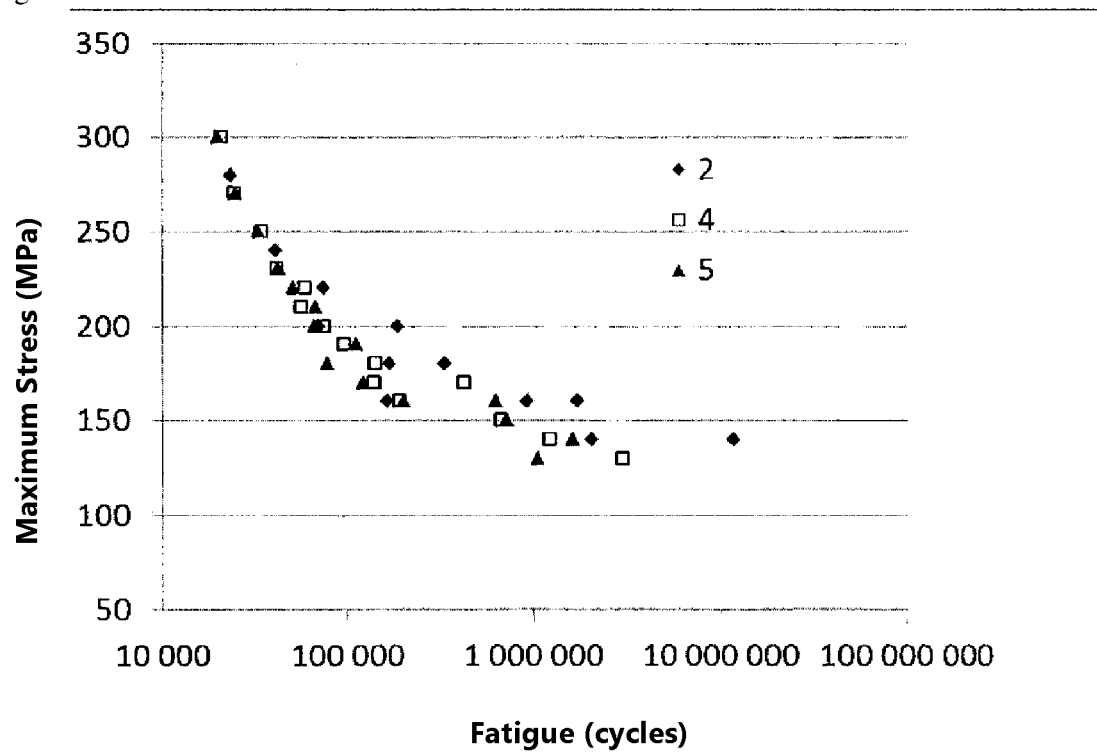
FIG. 3: Wöhler curves obtained with alloys 2, 4 and 5 in the L-T direction.

The corresponding Wöhler curves are shown in FIG. 3. The fatigue quality index IQF was calculated, the results of which are given in Table 6.

TABLE 6

Results of the fatigue tests

| Alloy | Results of open-hole fatigue tests (IQF) (MPa), 50% rupture for 100,000 cycles (L-T) |
|---|---|
| 2 | 218 |
| 4 | 196 |
| 5 | 195 |

The product according to the invention made of alloy 2 has a significantly improved IQF in relation to the reference products made of alloy 4 and 5.

The invention claimed is:

1. A method for manufacturing an extruded, rolled and/or forged product made of an alloy containing aluminium, said method comprising
    a) preparing a molten metal bath comprising 4.3 to 5.2% Cu by weight, 0.9 to 1.2% Li by weight, 0.2 to 0.25% Ag by weight, 0.1 to 0.25% Mg by weight, 0.08 to 0.18% Zr by weight, 0.01 to 0.15% Ti by weight, up to 0.2% Zn by weight, up to 0.6% Mn by weight, a Fe and Si content less than or equal to 0.1% by weight each, other elements with a content less than or equal to 0.05% by weight each and 0.15% by weight total, and the rest of aluminium;
    b) casting a raw form from said molten metal bath;
    c) homogenizing said raw form by a heat treatment in which the temperature at mid-thickness of the raw form reaches at least 510° C. for at least 10 hours,
    d) hot working said raw form that has been homogenized from (c) into an extruded, rolled and/or forged product;
    e) solution heat treating said product at a temperature of at least 515° C. and quenching;
    f) controlled stretching said product that has been solution heat treated and quenched from (e) with a permanent set of 0.5 to 5%;
    g) aging said product stretched with a permanent set from (f) by heating to a temperature of 150 to 160° C. for 5 to 70 hours.

2. The method according to claim 1, wherein the copper content of said molten metal bath lies between 4.3 and 5.0% by weight.

3. The method according to claim 1, wherein the lithium content of said molten metal bath lies between 1.0 and 1.15% by weight.

4. The method according to claim 1, wherein the magnesium content of said molten metal bath lies between 0.15 and 0.24% by weight.

5. The method according to claim 1, wherein the manganese content of said molten metal bath lies between 0.2 and 0.5% by weight.

6. The method according to claim 1, wherein the zirconium content of said molten metal bath lies between 0.11 and 0.18% by weight.

7. The method according to claim 1 wherein the solution heat-treatment temperature is at least 520° C.

8. The method according to claim 1, wherein the copper content of said molten metal bath lies between 4.4 and 4.8% by weight.

9. The method according to claim 1, wherein the zirconium content of said molten metal bath lies between 0.13 and 0.17% by weight.

10. The method according to claim 1 wherein stress relieving by controlled stretching is performed with a permanent set from 0.5 to 1.5%.

11. The method according to claim 1, wherein d) further comprises cold working the raw form after hot working and before homogenizing.

12. The method according to claim 1, wherein the extruded, rolled and/or forged product made of an alloy containing aluminium consists essentially of 4.3 to 5.2% Cu by weight, 0.9 to 1.2% Li by weight, 0.2 to 0.25% Ag by weight, 0.1 to 0.25% Mg by weight, 0.08 to 0.18% Zr by weight, 0.01 to 0.15% Ti by weight, up to 0.2% Zn by weight, up to 0.6% Mn by weight, a Fe and Si content less than or equal to 0.1% by weight each, other elements with a content less than or equal to 0.05% by weight each and 0.15% by weight total, and the rest of aluminium.

13. The method according to claim 1, wherein the extruded, rolled and/or forged product made of an alloy containing aluminium consists of 4.3 to 5.2% Cu by weight, 0.9 to 1.2% Li by weight, 0.2 to 0.25% Ag by weight, 0.1 to 0.25% Mg by weight, 0.08 to 0.18% Zr by weight, 0.01 to 0.15% Ti by weight, up to 0.2% Zn by weight, up to 0.6% Mn by weight, a Fe and Si content less than or equal to 0.1% by weight each, other elements with a content less than or equal to 0.05% by weight each and 0.15% by weight total, and the rest of aluminium.

14. The method according to claim 1, wherein the product is a rolled product comprising a manganese content between 0.2 and 0.5% by weight and comprising a compressive yield stress in L direction of at least 653 MPa and a fracture toughness $K_Q$(L-T) of at least 20 MPa√m.

15. The method according to claim 1, wherein the solution heat treatment is performed in two steps, with a first step performed at a temperature between 515 and 520° C. and a second step performed at a temperature of at least 530° C.

* * * * *